(12) United States Patent
Ruch et al.

(10) Patent No.: US 7,983,036 B2
(45) Date of Patent: Jul. 19, 2011

(54) FLEXIBLE SHEET WITH SEALING SKIRT FOR KEYBOARD ASSEMBLY

(75) Inventors: Mark Ruch, The Woodlands, TX (US); Earl Moore, Cypress, TX (US); Paul Doczy, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 267 days.

(21) Appl. No.: 12/243,717

(22) Filed: Oct. 1, 2008

(65) Prior Publication Data

US 2009/0190294 A1    Jul. 30, 2009

Related U.S. Application Data

(60) Provisional application No. 61/024,581, filed on Jan. 30, 2008.

(51) Int. Cl.
*G06F 1/16* (2006.01)

(52) U.S. Cl. .................................. 361/679.55; 400/472

(58) Field of Classification Search ............. 361/679.55, 361/679.08, 679.09; 400/472
See application file for complete search history.

(56) References Cited

U.S. PATENT DOCUMENTS

| | | | |
|---|---|---|---|
| 5,612,692 A * | 3/1997 | Dugas et al. | 341/22 |
| 6,398,436 B1 * | 6/2002 | Chao | 400/472 |
| 6,542,355 B1 * | 4/2003 | Huang | 361/679.08 |
| 6,716,518 B2 * | 4/2004 | Chao et al. | 428/308.4 |
| 6,803,865 B2 * | 10/2004 | DeLuga | 341/22 |
| 6,965,076 B2 * | 11/2005 | Wu | 174/541 |
| 7,365,967 B2 * | 4/2008 | Zheng | 361/679.09 |
| 2003/0108374 A1 * | 6/2003 | Lien | 400/472 |
| 2003/0123916 A1 * | 7/2003 | Cheng | 400/472 |
| 2006/0198086 A1 * | 9/2006 | Wang | 361/680 |
| 2006/0291150 A1 * | 12/2006 | Lo et al. | 361/680 |
| 2007/0165368 A1 * | 7/2007 | Hsu et al. | 361/680 |
| 2009/0262492 A1 * | 10/2009 | Whitchurch et al. | 361/679.08 |

* cited by examiner

*Primary Examiner* — Lisa Lea Edmonds

(57) ABSTRACT

A computer comprises an upper housing, a lower housing, and a flexible sheet disposed between the housings. The sheet covers and area of least one of the housings. The sheet comprises an outer skirt that fits within a receiving portion in at least one of the housings thereby forming a seal around an edge of the computer.

9 Claims, 1 Drawing Sheet

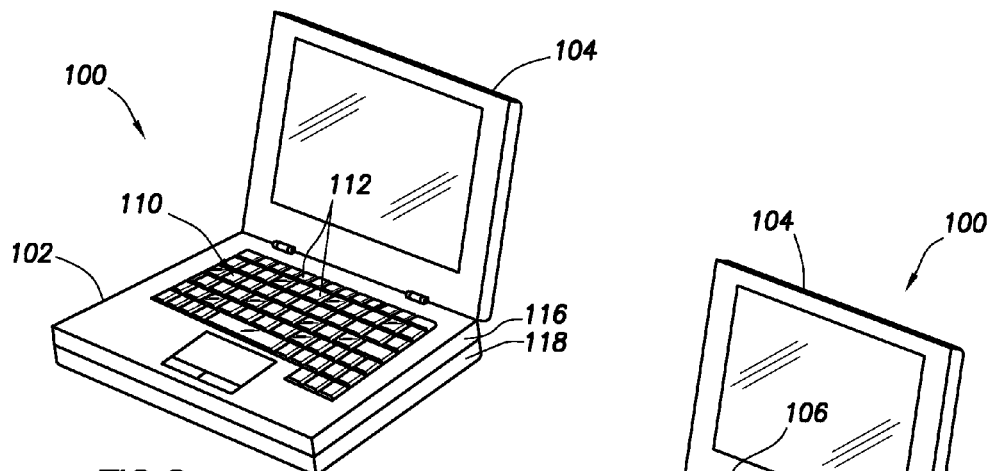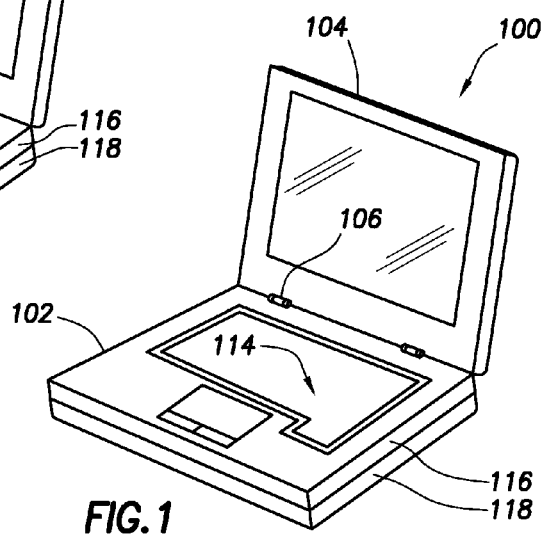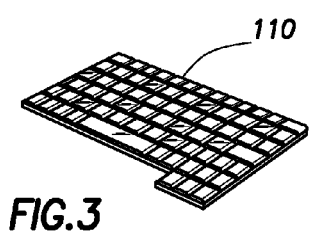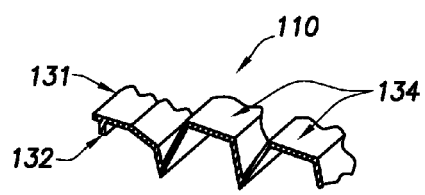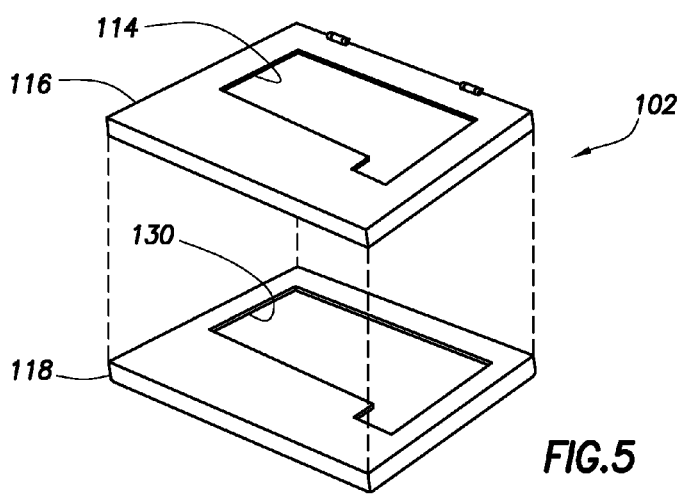

FLEXIBLE SHEET WITH SEALING SKIRT FOR KEYBOARD ASSEMBLY

CROSS REFERENCE TO RELATED APPLICATIONS

This application claims the benefit of provisional patent application Ser. No. 61/024,581, filed Jan. 30, 2008, titled "Flexible Sheet With Sealing Skirt For Keyboard Assembly."

BACKGROUND

Keyboard assemblies, such as those provided in notebook computers and free-standing keyboard assemblies, are susceptible to contamination from liquids, crumbs, dust, etc. in the vicinity of the keyboard assembly. Such contaminants may disrupt the operation of the keyboard assembly and thus the computer with which the keyboard assembly is used.

BRIEF DESCRIPTION OF THE DRAWINGS

For a detailed description of exemplary embodiments of the invention, reference will now be made to the accompanying drawings in which:

FIG. 1 shows a system in accordance with various embodiments and having an aperture;

FIG. 2 shows the system of FIG. 1 containing a keyboard assembly in the aperture in accordance with various embodiments;

FIG. 3 shows the keyboard assembly of FIG. 2 in accordance with various embodiments;

FIG. 4 illustrates a close-up view of a portion of the keyboard assembly of FIG. 2 in accordance with various embodiments; and FIG. 5 shows an exploded view of the system of FIG. 1 illustrating the receiving portion into which the keyboard assembly fits when installed.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

FIGS. 1 and 2 illustrate a system 100 comprising a chassis 102 to which a display 104 is coupled by way of a hinge 106. The chassis 102 comprises an upper housing 116 mated to a lower housing 118 and contains the computer's system board (not specifically shown) which comprises a processor, memory, etc. The upper housing 116 comprises an aperture 114 through which a keyboard unit 110 (FIG. 2) having a plurality of keys 112 is accessible to the user to operate system 100. In the embodiments of FIGS. 1 and 2, the system 100 is a notebook computer, but may be other than a notebook computer in other embodiments. In some embodiment, the concepts detailed below are applicable to a free-standing keyboard that is operatively coupled (via a cable or wireless) to a computer.

FIG. 3 illustrates the keyboard unit 110. The keyboard unit 110 of the disclosed embodiments comprises a unitary flexible sheet that covers an area of at least one of the housings 116, 118. In the embodiments, of FIGS. 1 and 2, the keyboard housing covers an area generally corresponding to aperture 114 of the upper housing 116. The flexible sheet of the keyboard unit 110 is made of an elastomeric material such as silicone rubber or plastic.

FIG. 4 illustrates a partial cross-sectional view of the keyboard unit 110 in accordance with various embodiments. The keyboard unit 110 is formed (e.g., molded) into a generally corrugated shape to substantially match the shape of keys on a typical keyboard. FIG. 5 shows an exploded view of the chassis 102 of system 100. As can be seen, the lower housing 118 comprises a receiving portion 130 that generally is the same shape as, but slightly larger than, the aperture 114 of the upper housing 116. In some embodiments, the receiving portion 130 is a groove. Referring to both FIGS. 4 and 5, the outer edges of the flexible sheet of the keyboard unit 110 comprises a skirt 131 that has an extending tongue portion 130 that fits within the receiving portion 130 of the lower housing 118. When the upper housing 116 is mated to the lower housing 118, with the keyboard unit 110 in place and tongue portion 132 installed into the receiving portion 130, the upper housing 116 presses against the flexible sheet thereby forming a seal around an edge of the keyboard unit 110. The flexible sheet and resulting seal formed between the upper and lower housings 116, 118 using the tongue portion 130 of the flexible sheet prevent many or all contaminants from infiltrating the system 100.

In some embodiments, the skirt 131 and tongue portion 132 extend continuously around the entire flexible sheet and thus around all of the aperture 114. In some embodiments, however, the skirt 131 and tongue portion 130 extend around some, but not all, of the flexible sheet and thus around some, but not all, of the aperture 114.

The alphanumeric labels (letters, numbers, "insert," etc.) of a keyboard can be stenciled on to the tops 134 (FIG. 4) of the corrugated flexible sheet. In other embodiments, plastic key caps are molded with the flexible sheet during manufacturing of the keyboard unit 110. In this latter embodiment, a seal is thus formed between the flexible material and the plastic key caps embedded therein during the molding process.

To the extent the upper and lower housings 116 and 118 can be detached from one another, the keyboard unit 110 can be removed, cleaned and/or replaced.

In embodiments in which the keyboard unit 110 is used with a free-standing keyboard, the flexible sheet of the keyboard unit extends to the outer edges of such a keyboard. Accordingly, a seal is formed around the outer edges of such a keyboard rather than along internal edges around the aperture 114 in the embodiments discussed above. In a free-standing keyboard, the keyboard unit 110 thus covers substantially all of a lower housing of such a keyboard.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer, comprising:
   an upper housing;
   a lower housing; and
   a keyboard unit comprising:
   a flexible sheet disposed between said housings, said sheet covering an area of least one of said housings, and said sheet comprising an outer skirt that fits within a receiving portion in at least one of said housings thereby forming a seal around an edge of said computer.

2. The computer of claim 1 wherein the flexible sheet is made of an elastomeric material.

3. The computer of claim 1 wherein the receiving portion comprises a groove that extends around at least a portion of at least one of the housings.

4. The computer of claim 3 wherein the skirt comprises a tongue portion fits into said groove.

5. The computer of claim 1 wherein the receiving portion comprises a groove that extends around all of at least one of the housings.

6. The computer of claim 1 wherein alphanumeric characters are provided on the flexible sheet.

7. The computer of claim 1 wherein the flexible sheet comprises key caps.

8. The computer of claim 1 wherein the flexible sheet has a corrugated shape.

9. The computer of claim 1 wherein the computer comprises a notebook computer and the upper and lower housings contain a system board.

* * * * *

UNITED STATES PATENT AND TRADEMARK OFFICE
CERTIFICATE OF CORRECTION

| | | |
|---|---|---|
| PATENT NO. | : 7,983,036 B2 | Page 1 of 1 |
| APPLICATION NO. | : 12/243717 | |
| DATED | : July 19, 2011 | |
| INVENTOR(S) | : Mark Ruch et al. | |

It is certified that error appears in the above-identified patent and that said Letters Patent is hereby corrected as shown below:

In column 3, line 17, in Claim 1, delete "of least" and insert -- of at least --, therefor.

Signed and Sealed this

Seventh Day of February, 2012

David J. Kappos
*Director of the United States Patent and Trademark Office*